June 27, 1950    J. A. HAESELER    2,512,772
REFLEX CAMERA HAVING REFLECTING FINDER SYSTEM
Filed Oct. 30, 1945

INVENTOR
John A. Haeseler
BY
Emery, Varney, Whittemore & Dix
ATTORNEYS

UNITED STATES PATENT OFFICE 2,512,772

REFLEX CAMERA HAVING REFLECTING FINDER SYSTEM

John A. Haeseler, Woodbridge, Conn.

Application October 30, 1945, Serial No. 625,655

4 Claims. (Cl. 95—42)

This invention relates to miniature cameras and more particularly to finder systems of such cameras.

It is an object of the invention to provide an improved finder system for reflex type cameras which will also serve as a means for focusing the cameras. With this invention the camera is held at eye level and the image is seen through an eyepiece with the subject upright and the right and left sides of the field correct.

The invention obtains these results with a compact system of reflectors, which at the same time that the reflectors turn the image and transpose the sides, produces sufficient total length of light travel so that an eyepiece can be used which will cover the entire area of the ground glass, and also produce good magnification. The image seen is upright and with correct sides for vertical as well as horizontal pictures. In addition to the regular camera lens the system employs one or more lenses that make it practical to incorporate a finder system of this character into a miniature camera.

One feature of the invention relates to a combination of optical elements that permits the finder system to be contained in a minimum size of camera casing, and to a positioning of the system below the lens mount of the camera. Another feature relates to the location of the eyepiece of the finder system at the back and in an intermediate position between the ends of the casing. By virtue of this feature the user's nose does not keep the eyepiece of the finder system from being brought close to the eye because the camera is held so that the eyepiece is at the bottom for taking horizontal pictures and at the side for taking vertical pictures.

In order to obtain a camera casing that has a minimum front-to-back dimension, the preferred embodiment of this invention has a sliding frame correlated with the lens mount for moving parts of the structure into a more compact relation when not in use.

Other objects, features and advantages of the invention will appear or be pointed out as the description proceeds.

In the drawing, forming a part hereof, in which like reference characters indicate corresponding parts in all the views, Figure 1 is a diagrammatic, vertical sectional view taken through a camera embodying this invention, the section being taken along the line 1—1 of Figure 2.

Figure 3:
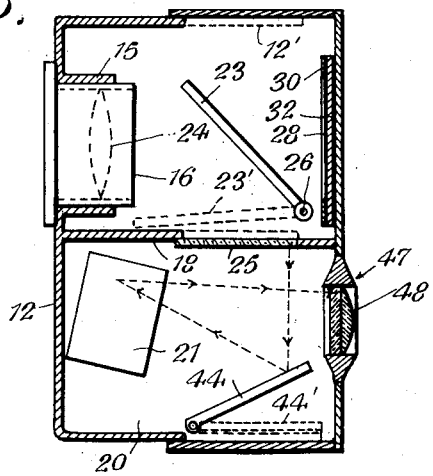
Figure 3 is a diagrammatic sectional view taken on the line 3—3 of Figure 1.

The camera shown in the drawing includes a casing 10 having guide partitions 11 for guiding a sliding front 12. In the upper portion of the sliding front 12 there is a lens mount 15 (Figure 3), and a lens assembly that includes a barrel 16 which moves back and forth in the lens mount for focusing the camera. The structure is shown diagrammatically, but it will be understood that any suitable apparatus for moving the lens back and forth can be used.

The lower portion of the sliding front 12 is divided off from the upper portion by an opaque partition 18. A prism 21 is permanently attached to the sliding front 12 below the partition 18 with the dihedral angle at the front of the prism disposed with its vertex at an angle to the plane of the ground glass 25.

Behind the lens mount 15 there is a mirror 23 for reflecting light from a lens 24, located in the barrel 16, down against a ground glass 25. The mirror 23 is supported by a hinged connection 26 about which the mirror is movable into the dotted line position 23' so that light from the camera lens 24 can be thrown on a film 28 through an opening in a film gate 30. The film is held against the back of the film gate 30 by a pressure plate 32 in accordance with conventional practice. Before the sliding front 12 is pushed back into the dotted line position 12' to collapse the camera for compactness in carrying the mirror 23 is swung up into a position directly in front of the film gate 30.

Figure 1:
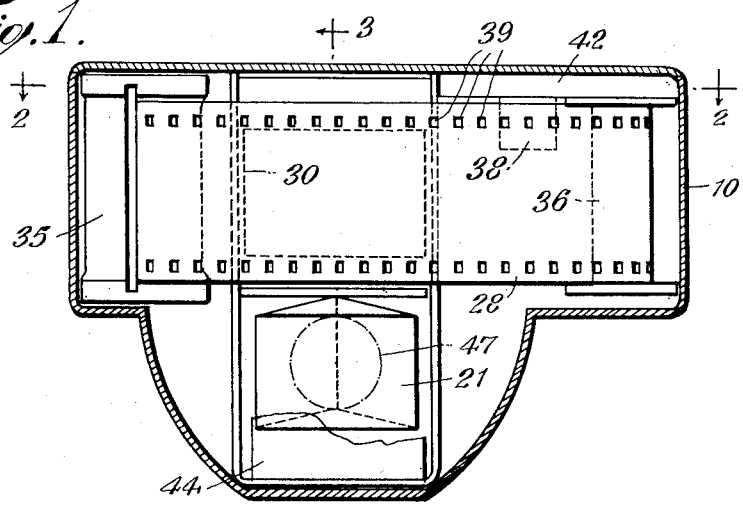
Figure 2:
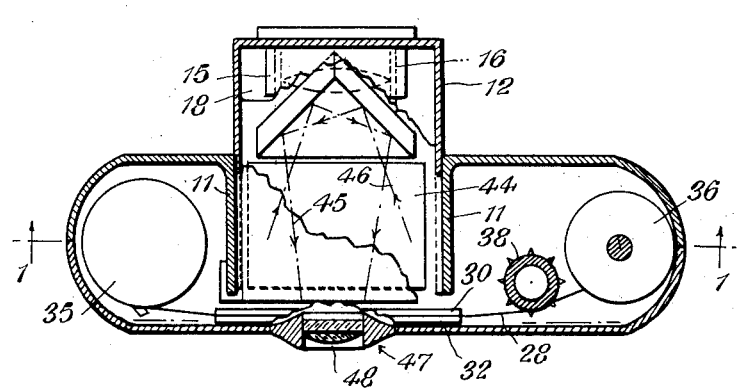
Figure 2 is a diagrammatic sectional view, on the line 2—2 of Figure 1, but partly broken away to show parts of the underlying finder structure in section.

The camera is designed for use with motion picture film, preferably of the 35 millimeter size. At one side of the camera there is a magazine 35 in which the film 28 is contained for loading, and the film is wound from the magazine 35 to a spool 36. The length of film moved after each exposure is determined by a sprocket 38 having teeth that engage with the upper row of sprocket openings 39. Apparatus for turning the spool 36 and sprocket 38 to wind the film is contained within a housing 42 (Figure 1) in the upper part of the casing 10. The construction of this apparatus and its controls are not illustrated in the drawing since its disclosure is not necessary for a complete understanding of this invention.

The finder apparatus of this invention is located in the chamber 29 and includes a reflector 44 located below the ground glass 25 and disposed at such an angle that it reflects the light beam from the ground glass 25 forward to the prism 21. From the prism the image is reflected to an eyepiece 46 in the back of the camera casing 10. The prism 21 has reflecting faces at right angles to one another and it is in position to serve as a roof reflector, that is, each of the reflecting surfaces reflects light to the other reflecting surface for reversing the sides of the image and this reversal counteracts the reversal of sides caused by the lens 24 and reflector 23 in producing the image on the ground glass 25. The reversal of the sides of the image is illustrated by the light rays 45 and 46 which represent rays from the left and right sides, respectively, of the ground glass, that pass to the prism 21, across from one side to the other of the prism, and then back to the eyepiece as indicated by the directions of the arrow heads along the rays.

The eyepiece 47 includes a lens 48 that makes it possible for the user of the camera to focus his eye on the reflected image of the ground glass 25 even though the total distance from the ground glass 25 to the eyepiece 47, by way of the reflected light beam, is too short for the normal human eye to focus. At the same time the eyepiece gives good magnification to enable the focusing of the image from the lens 24 on the ground glass 25. The finder assembly has the upper end of the prism at substantially the level of the ground glass and the reflector 44 extending above the bottom level of the prism and up to the bottom level of the eyepiece so as to make the finder structure compact and suitable for use in a miniature camera.

When the camera is not in use, the sliding front 12 is pushed back into the dotted line position indicated by the reference character 12' so as to reduce the overall thickness of the camera. The reflector 44 folds down into the dotted line position 44' in order to provide clearance for the prism 21 when the sliding front is in retracted position.

The location of the eyepiece 47 at the lower part of the casing 12 makes it possible for the user of the camera to bring the eyepiece close to the eye with less interference by the nose than if the eyepiece were located at the top of the camera, but it will be understood that the terms "top" and "bottom," as used in this description and in the claims, are relative, and that the camera can be used with the structure turned in any position. The casing can be conveniently used for taking vertical pictures by changing the position of the camera through an angle of 90 degrees as viewed in Figure 1, and when taking such vertical pictures the eyepiece 47 is conveniently located for eye level focusing without having the camera casing strike the user's nose. This is true whether the eyepiece is held either to the right or the left eye.

The preferred embodiment of the invention has been described, with reference to the diagrammatic illustrations in the drawing, but changes and modifications can be made, and some features of the invention can be used without others within the definition of the invention as set forth in the claims.

I claim as my invention:

1. A miniature camera comprising a casing having a relatively fixed portion, and a movable center portion that can be extended out beyond the front of the fixed portion of the casing on both sides of the center and that telescopes into the fixed portion to collapse the camera when not in use, a lens mount at the front of the movable portion of the casing, a chamber in the movable portion of the casing immediately below the lens mount, a finder system comprising a movable reflector behind the lens, a ground glass below the reflector and on which an image is focused on an illuminated field of the ground glass, another reflector below the ground glass for reflecting light from the illuminated field of the ground glass forwardly and slightly upwardly, a third reflector in the chamber and on the movable portion of the casing and disposed below the ground glass and ahead of the forward edge of the illuminated field of the ground glass when the movable portion of the casing is in an extended position to reflect light rearwardly and in a direction substantially parallel to the plane of the ground glass, and an eyepiece opening through the back of the fixed portion of the camera casing in position to receive the light beam from the third reflector.

2. A reflex camera including a lens, a casing, a ground glass, a reflector for reflecting light rays from the lens to the ground glass, and finder apparatus for viewing the image on the ground glass, said finder apparatus comprising a first reflector within and connected to the camera casing below the ground glass and in position for directing light rays from the ground glass forward, a second reflector having two reflecting surfaces at an angle to one another and disposed below the ground glass and in front of the first reflector in position to reflect the light rays from the first reflector and to reverse the sides of the ground-glass image, an eyepiece opening through and attached to the back of the camera casing and to which the ground-glass image is reflected by said second reflector, and a support that holds the second reflector in a position between the ground glass and the first reflector when the finder is not in use, said support comprising a movable portion of the casing that is movable toward and from the back of the camera far enough to carry the second reflector to a position ahead of the forward edge of the illuminated field of the ground glass, said movable portion of the casing enclosing a chamber in which the reflectors of the finder apparatus are housed and separated from the space within the casing above the ground glass.

3. A camera comprising a main casing and a sliding front that telescopes into the main casing to produce a more compact structure when the camera is not in use, a lens carried by the sliding front, a film gate located behind the lens and in the main casing, a movable reflector between the lens and the film gate and adapted to occupy a position at an angle to the optical axis of the lens, a ground glass on which an image is focused by light transmitted through the lens and reflected by said movable reflector, partitions dividing the camera casing and sliding front to form a finder-system chamber on the side of the ground glass opposite said movable reflector, a first reflector located below the ground glass and at an angle to the plane of the ground glass for directing light rays from the ground glass forward with an upward component, a second reflector secured to the sliding front in the path of the reflected light rays from the first finder reflector, said second reflector including two reflecting surfaces at right angles to one another and with their line of intersection in substantially the same vertical plane with the optical axis of the lens, the reflecting surfaces of said second reflector being disposed at angles that change the sides of the image and direct the reflected light rays from the first reflector rearwardly to an eyepiece opening through the back of the camera casing.

4. A camera comprising a main casing and a sliding front that telescopes into the main casing to produce a more compact structure when the camera is not in use, a lens carried by the sliding front, a film gate located behind the lens and in the main casing, a movable reflector between the lens and the film gate and adapted to occupy a position at an angle to the optical axis of the lens, a ground glass on which an image is focused by light transmitted through the lens and reflected by said movable reflector, a first reflector located below the ground glass and at an angle to the plane of the ground glass for directing light rays from the ground glass forward with an upward component, a second reflector secured to the sliding front in the path of the reflected light rays from the first finder reflector, said second reflector including two reflecting surfaces at right angles to one another and with their line of intersection in substantially the same vertical plane with the optical axis of the lens, the reflecting surfaces of said second reflector being disposed at angles that change the sides of the image and direct the reflected light rays from the first reflector rearwardly to an eyepiece opening through the back of the camera casing.

JOHN A. HAESELER.

REFERENCES CITED

The following references are of record in the file of this patent:

UNITED STATES PATENTS

| Number | Name | Date |
|---|---|---|
| 741,102 | Borsum | Oct. 13, 1903 |
| 2,252,640 | Nuchterlein | Aug. 12, 1941 |
| 2,310,273 | Bancroft | Feb. 9, 1943 |
| 2,323,005 | Bertele | June 29, 1943 |

FOREIGN PATENTS

| Number | Country | Date |
|---|---|---|
| 39,991 | France | Dec. 28, 1931 |
| | (Addition to 678,148) | |
| 556,783 | Germany | Jan. 28, 1933 |
| 879,245 | France | Nov. 10, 1942 |
| 884,054 | France | Apr. 12, 1943 |

OTHER REFERENCES

Ser. No. 304,702, Kuppenbender (A. P. C.), published May 4, 1943.